Oct. 20, 1936.  J. D. SPALDING  2,058,187
SPRING HOOK
Filed Aug. 25, 1934  4 Sheets-Sheet 4
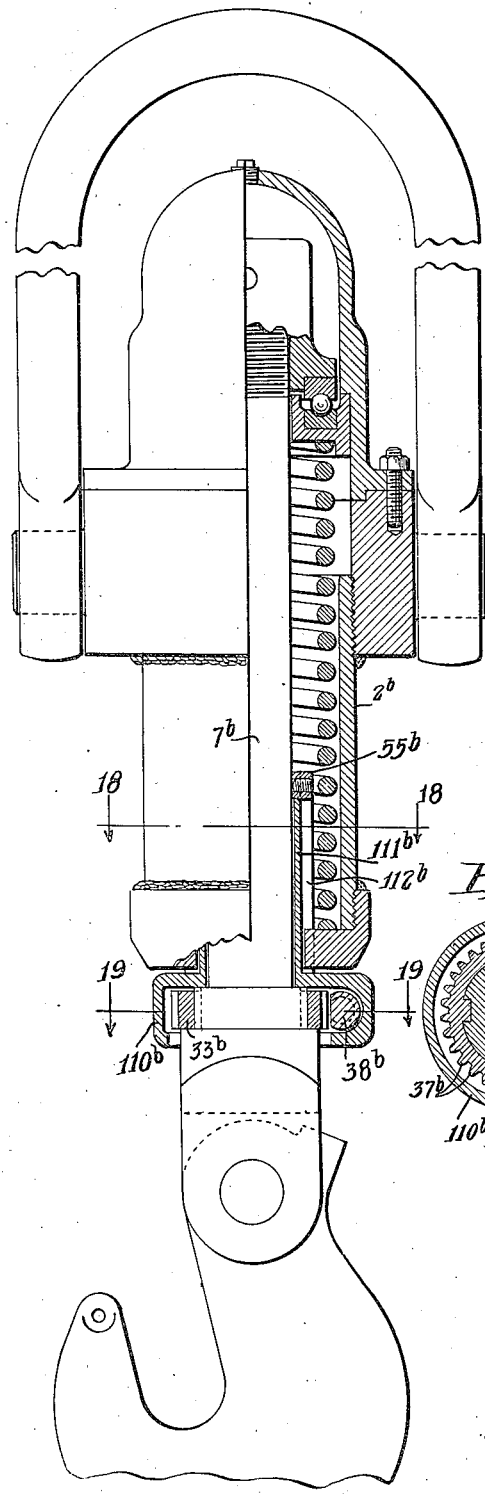
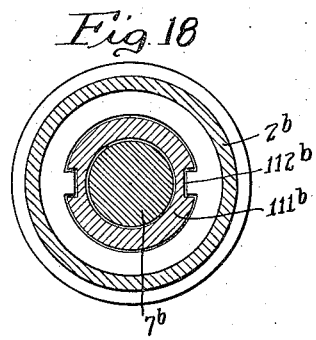
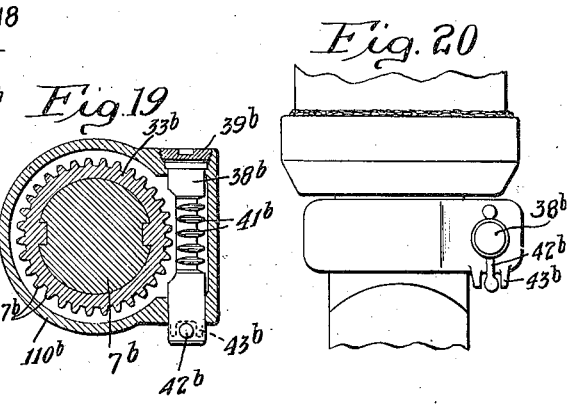
Inventor
John D. Spalding
By Lyon & Lyon
Attorneys Patented Oct. 20, 1936

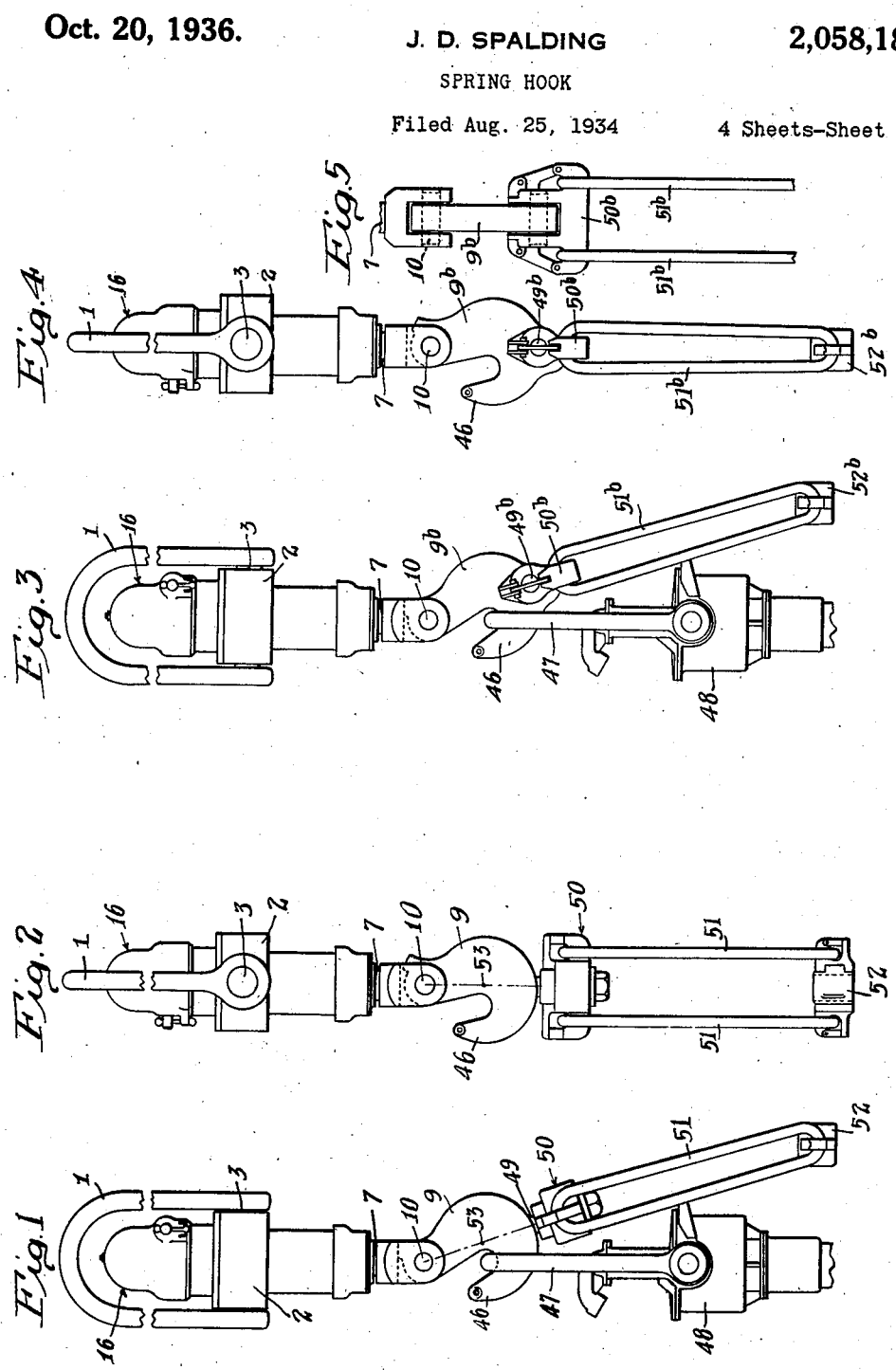

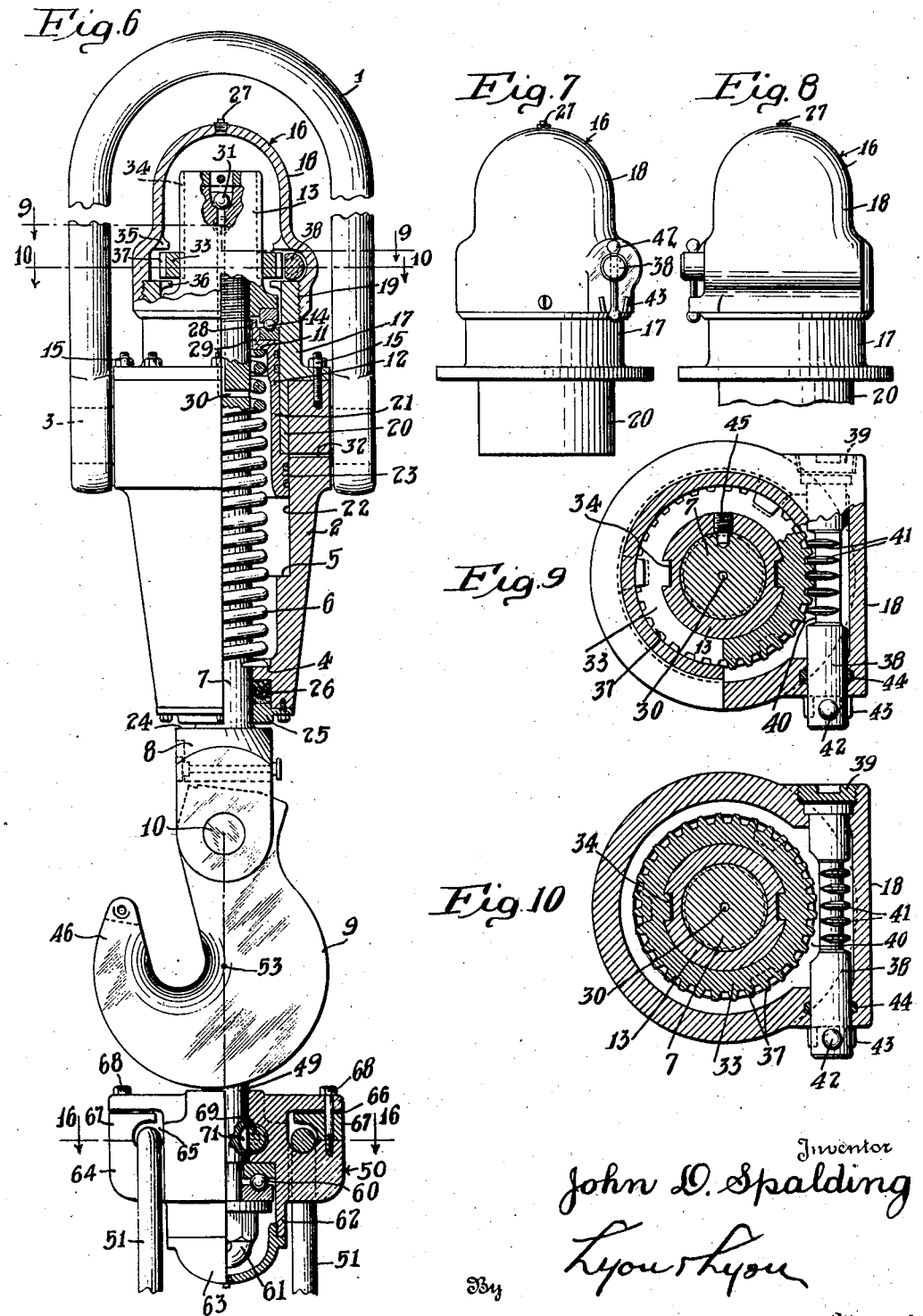

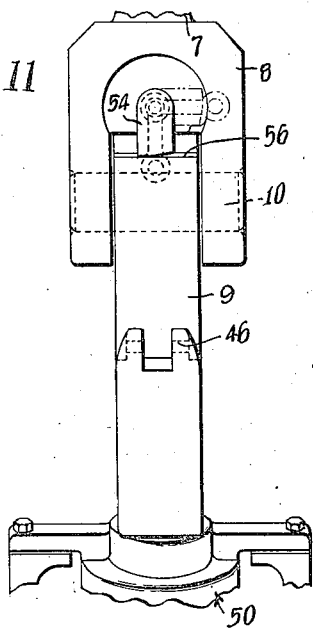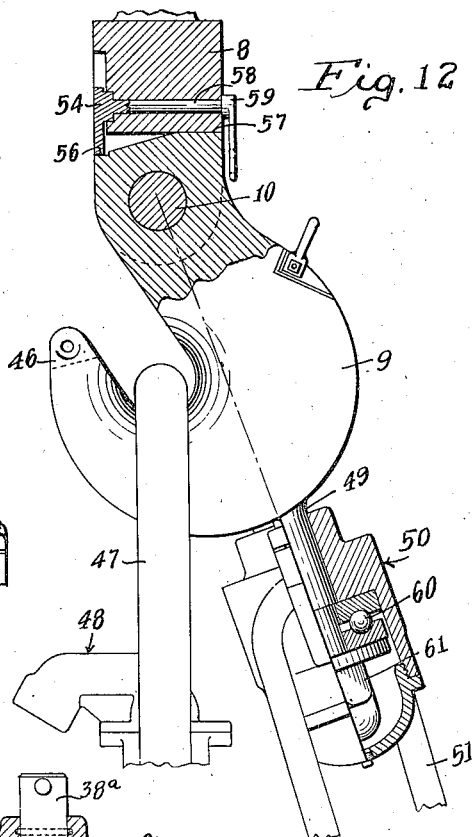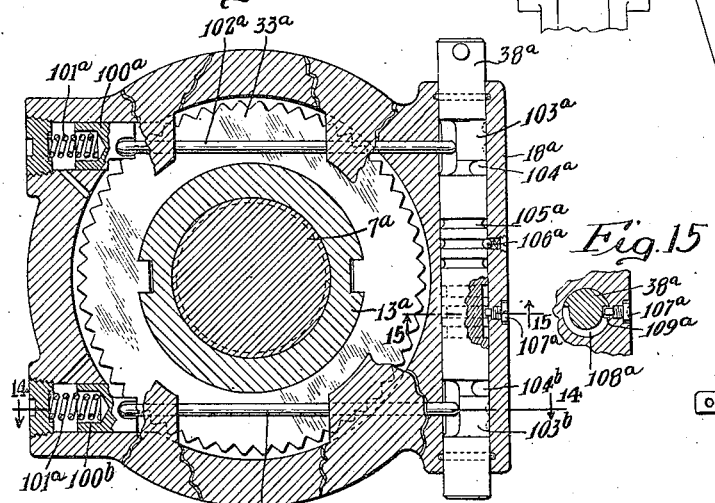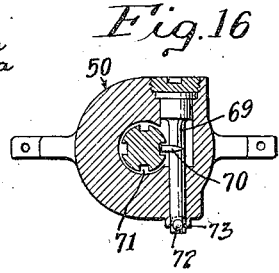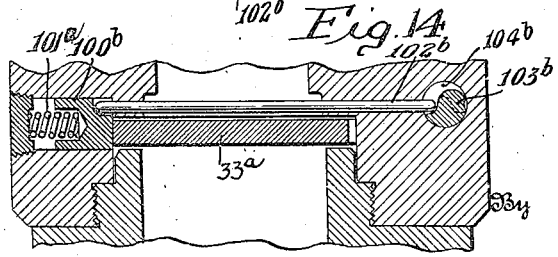

2,058,187

UNITED STATES PATENT OFFICE 2,058,187

SPRING HOOK

John D. Spalding, Los Angeles, Calif., assignor to The National Superior Company, Toledo, Ohio, a corporation of Delaware Application August 25, 1934, Serial No. 741,531

29 Claims. (Cl. 294—82)

This invention relates to spring hooks, and more particularly to a spring hook of the character used in connection with oil well rotary drilling or similar operations.

An object of this invention is to provide a means whereby the operation incident to the changing from drilling operations to the operation of removing the drill pipe from the well, or the operation of removing the drill pipe from the well to drilling operations may be more readily and quickly accomplished.

Another object of this invention is the provision of means in a spring hook for dampening the recoiling action of the hook when released and when the hook is in extended position.

Another object of this invention is to provide in a spring hook a new and improved type of locking means which will permit of the reciprocation of the hook support while permitting the hook to be rotated or locked against rotation as desired.

Other objects and advantages of this invention it is believed will be apparent from the following detailed description of a preferred embodiment thereof as illustrated in the accompanying drawings.

In the drawings:

Figure 1 is an elevation of a spring hook embodying my invention illustrating the hook as connected with the bail of a swivel and illustrating an elevator as depending from a yoke carried by the hook.

Figure 2 is a similar elevation of a spring hook embodying my invention illustrating the swivel removed and with the elevator hanging free in position in axial alignment with the axis of the spring hook assembly.

Figure 3 is a side elevation of the modified form of spring hook embodied in my invention wherein the elevator supporting means are so adapted to the hook as to prevent rotation thereof.

Figure 4 is an elevation similar to Figure 3 illustrating the swivel as removed and with the elevator hanging in position in alignment with the axis of the spring hook assembly.

Figure 5 is a fragmental side elevation of the hooking yoke assembly as illustrated in Figure 4.

Figure 6 is an enlarged elevation partly in vertical mid-section of the spring hook as illustrated in Figures 1 and 2.

Figure 7 is an elevation of the cap as embodied in the assembly or spring hook illustrated in Figure 6.

Figure 8 is an elevation of the cap assembly as illustrated in Figure 7 with the cap rotated substantially 90° from its position as illustrated in Figure 7.

Figure 9 is a sectional end view taken substantially on the line 9—9 of Figure 6.

Figure 10 is a sectional end view taken substantially on the line 10—10 of Figure 6.

Figure 11 is a fragmental elevation illustrating the means provided for securing the hook and shank rigidly together.

Figure 12 is a sectional side elevation of the structure as illustrated in Figure 11.

Figure 13 is a sectional end view illustrating the modification of a lock means as illustrated in Figures 9 and 10.

Figure 14 is a fragmental vertical sectional view taken substantially on the line 14—14 of Figure 13.

Figure 15 is a fragmental sectional view taken substantially on the line 15—15 of Figure 13.

Figure 16 is a horizontal sectional view taken substantially on the line 16—16 of Figure 6.

Figure 17 is an enlarged elevation partly in vertical mid-section of a spring hook having a modification of the locking means as illustrated in Figure 6.

Figure 18 is a sectional end elevation taken substantially on the line 18—18 of Figure 17.

Figure 19 is an end elevation taken substantially on the line 19—19 of Figure 17.

Figure 20 is a fragmental elevation of the spring hook assembly illustrated in Figure 17.

As illustrated in the drawings, 1 indicates a bail which is pivotally secured to a sleeve 2 at trunnions 3. The sleeve 2 is provided with spaced shoulders 4 and 5. Positioned within the sleeve 2 is a shank 7 which is, formed with a clevis 8 carrying a hook 9 by means of a pin 10 passed through the clevis 8 and the hook 9. The shank 7 is supported within the sleeve 2 upon a coiled spring 6 which rests at its lower end upon the lower shoulder 4 and engages at its upper end with a shoulder 11 of the differential piston sleeve 12. Secured to the upper end of the shank 7 is a nut 13. Interposed between the nut 13 and the upper surface of the differential piston sleeve 12 is an anti-friction type thrust bearing 14.

Secured to the upper end of the sleeve 2 by means of bolts 15 is a cap assembly consisting of a flanged member 17 and a cap member 18. The cap member 18 is threadedly secured to the flanged member 17 at the threads 19. The flanged member 17 has a downwardly extending cylindrical portion 20 which fits within the interior of the sleeve 2 to define a cylindrical bore to fit the reduced portion 21 of the differential piston sleeve 12. The lower portion 23 of the piston sleeve 12 fits within the bore 22 of the sleeve 2. The diameters of the piston sections 21 and 23 of the sleeve 12 are so proportioned that the area of the smaller section is equal to the annular area defined between the sleeve bore 22 and the cylindrical shank 7 so that upon reciprocation of the shank 7 relative to the sleeve 2, the fluid within the chamber thus provided within the body of the hook supporting structure will be transferred from one side of the piston to the other without change of volume in a manner and for the purpose as hereinafter set forth.

The spring 6 is preferably so designed in the manner heretofore common in the art to support a certain initial load before deflecting from the extended position as illustrated in Figure 6 and so that when the hook 9 is supporting its normal load when drilling or during the operation of unscrewing the drill pipe sections when removing the drill pipe from the well, the spring 6 is deflected until the load is supported directly on the shoulder 5 through the sleeve 12 and bearing 14.

With this construction the spring 6 is never over-stressed or compressed solid, that is, in coil-to-coil contact. This is the preferable construction although it is not intended that this specific proportioning or designing of the spring 6 should in any way constitute a limit of the invention as herein set forth as under some conditions springs have been utilized in such spring hook constructions where the spring 6 is compressed into coil-to-coil contact.

The upward travel of the spring 6 is limited by a stop defined between the lower and enlarged portion 23 of the piston sleeve 12 and the lower end of the flanged member 17. As will thus be evident from Figure 6, the upper end 24 of the clevis 8 is spaced from the gland cap 25 so as to permit free swiveling of the hook shank on the bearing 14.

Packing 26 is provided in the packing recess formed in the lower end of the sleeve 2 and retained in place by the gland cap 25.

In my copending application, Serial No. 724,503, filed May 8, 1934, for Spring hook, I have disclosed a spring hook having a form of means for dampening the recoil of the spring.

The structure as disclosed in this application for dampening the recoiling action of the spring discloses an improved means for dampening the recoiling action of the spring preferably of the following construction:

This construction includes the sleeve 2, cap assembly 16, piston 12, shank 7, and packing 26, which cooperate to define a sealed and enclosed chamber within the body of the means provided for supporting the shank 7 and which body likewise provides the means by which the bail 1 is connected with the spring hook. This enclosure is preferably filled with a fluid such as oil which is admitted to the interior of the chamber thus defined through a filler opening which is normally closed by a pipe plug 27. The chamber is preferably so filled with oil or other fluid, preferably of a non-compressible character so as to exclude air from the interior of the chamber.

As heretofore set forth, the differential piston sleeve is so formed as to compensate for change in volume within the chamber upon reciprocation of the shank 7 supporting the hook 9, due to the fact that on reciprocation shank 7 reciprocates through the stuffing box 25.

From the proportions as above set forth, it will be obvious that the fluid within the chamber may be transferred from one side of the piston to the other upon reciprocation of the shank 7 without change of volume taking place.

In order to utilize the transfer of the fluid or oil within the chamber from one side of the piston to the other to dampen the action of the spring 6, it is only necessary that the fluid pass through a restriction. To accomplish this result I prefer to proportion the annual clearance 28 between the shank 7 and inwardly projecting annular flange 29 of the piston 12 to effect the desired throttling action to the flow of the fluid therethrough.

I prefer to render the snubbing action thus provided comparatively ineffective on the downward travel of the shank 7. In order to accomplish this purpose I form through the shank 7 a passage 30 which establishes communication between the upper and lower ends of the chamber. A check valve 31 is mounted in this passage which upseats upon the upward flow of the fluid through the passage 30, thereby rendering the snubbing action only partly effective. Upon the reversal of the flow of fluid, the valve 31 seats and all fluid must flow through the restriction 28 upon upward movement of the shank relative to the body of the spring hook and when under the influence of the force of the spring 6.

In order to permit a freedom of movement of the piston 12 within the sleeve 2 a vent 32 is formed in the wall of the sleeve 2 communicating with the annular space defined between the lower end of the flange member 17 and the upper end of the enlarged portion 23 of the piston sleeve 12 and between the walls of the piston sleeve 12 and the inner periphery of the sleeve 2 when the hook member 9 is moved downwardly from the position as illustrated in Figure 6.

In order to provide a means for locking the shank 7 from rotation within the assembly as thus described and permit of the longitudinal motion of the shank 7, I prefer to provide a lock ring 33 which is keyed in splined ways 34 to the nut 13. The lock ring 33 is confined between the upper and lower members of the cap assembly 16 by means of inwardly projecting shoulders 35 and 36, and is free to rotate with the nut 13 but is thereby restricted against axial movement. The periphery of the lock ring 33 is formed with a plurality of teeth 37 which may be, as illustrated in the drawing, of the form of a conventional spur gear.

A lock shaft 38 is journaled within the cap 18 and is retained in position by means of a plug 39. The shaft 38 is recessed at 40 to permit rotation of the lock ring 33 but is formed with lock teeth 41 so that when the shaft is rotated from the position illustrated in Figure 10 to the position illustrated in Figure 9, the teeth 41 will engage between the teeth 37 to hold the lock ring 33 and thus the shank 7 from rotation relative to the body of the spring hook. When thus locked in position, the shank 7 will be free to move axially within the body.

In order to rotate the shaft 38 the shaft is provided with a handle 42, which handle 42 is double-headed and is slidably passed through a bore formed in the end of the shaft 38 so that in either of its operative positions the shaft will be retained against rotation by dropping into an opening defined by two ribs 43 formed on the cap 18. Packing 44 is provided around the shaft 38 to seal the opening in the cap 18 through which the shaft projects.

In order to hold the nut 13 from rotation relative to the shank 7, some form of lock means are preferably provided such, for example, as the lock plug 45 which is threaded through an opening formed in the nut 13 so that its end projects into a mating hole formed in the shank 7. By this means the shank 7 is locked against rotation by the means above described or by other means to prevent the nut 13 from rotating upon its threaded connection with the shank 7.

In the modified form of locking means as illustrated in Figures 13, 14, and 15, there is provided a means for selectively locking the shank 7a from rotation in either direction, or in both directions, as desired, while still permitting the shank 7a to move axially within the assembly. In this construction the lock ring 33a is splined upon the nut 13a and held from relative vertical movement in the same manner as in the modification previously described.

A pair of spring ratchets 100a and 100b are positioned in opposite directions to the rotation of the lock ring 33a and are urged into engagement with the lock ring 33a by means of springs 101a. With the ratchets 100a and 100b moved to position as illustrated in Figure 13, the shank 7a will be held against rotation in either direction. In order to actuate the ratchets 100a and 100b to and from latching position with reference to the teeth of the lock ring 33a, the actuating shaft 38a is journaled within the cap 18a in such manner as to permit both of rotation of the shaft 38a and axial translation thereof. Ratchet actuating rods 102a and 102b operatively connect the ratchets 100a and 100b with the actuating shaft 38a.

Formed on the shaft 38a are cams 103a and 103b which, upon rotation of the shaft 38a, engage the ends of the actuating rods 102a and 102b to force the ratchets 100a and 100b away from the teeth of the lock ring 33a.

As illustrated in Figure 13, with the shaft 38a in the position therein illustrated, upon rotation of the shaft 38a both the ratchets 100a and 100b would be forced from engagement with the lock ring 33a to permit free rotation of the shank 7a in either direction. The shaft 38a is recessed at 104a and 104b with reference to each of the ratchets 100a and 100b so that upon axial translation of the shaft 38a, the rods 102a and 102b may be positioned within the recesses 104a or 104b depending upon the position of the shaft 38a so that upon rotation of the shaft 38a in such position the rods 102a or 102b will not be actuated to force the ratchets 100a or 100b from engagement with the teeth of the lock ring 33a, depending upon the translated position of the shaft 38a. Thus either the ratchet 100a or 100b may be engaged, and with the ratchet 100a engaged, the shank 7a will be held from rotation counter-clockwise, and with the ratchet 100b in engagement with the teeth of the ratchet, the lock ring 33a, the shank 7a will be held from rotation in a clock-wise direction.

In order to hold the shaft 38a in any one of its translated positions, I prefer to employ the following means:

Formed in the shaft 38a are a series of grooves 105a which correspond in their positions to the translated positions of the shaft 38a and a spring-pressed detent 106a provided for yieldably holding the shaft in any one of its three positions.

In order to prevent the translation of the shaft 38a, except in substantially the position of the shaft as illustrated in Figure 13, to prevent jamming of the construction, I have illustrated a cap screw 107a threaded into the cap 18a in position so that its end will travel in any one of the series of recesses 108a upon the rotation of the shaft 38a to actuate ratchets 100a and 100b. A transverse slot 109a is formed in the shaft communicating between the recesses 108a so that when the shaft 38a is rotated to the position occupied by the shaft 38a in the position shown in Figure 13, the end of the cap screw 107a travels through the slot 109a. In any other position the end of the cap screw 107a will prevent translation of the shaft 38a, thereby preventing the jamming of the ends of the actuating rods 102a and 102b.

In Figures 17, 18, 19, and 20, I have illustrated a further modified form of lock means in which modification the lock ring 33b is keyed to the shank 7b. A housing 110b is rotatably mounted on the shank 7b and encloses the lock ring 33b. The lock shaft 38b is journaled in the housing 110b and has lock teeth 41b which engage the teeth 37b of the lock ring 33b upon rotation of the shaft 38b to hold the lock ring 33b and shank 7b from rotation relative to the housing 110b.

In order to hold the housing 110b from rotation relative to the sleeve 2b, a sleeve extension 111b is splined as indicated at 112b to register with the complementary opening formed in the lower end of the sleeve 2b. The collar 55b is clamped to the shank 7b to prevent the upward displacement of the housing 110b relative to the lock ring 33b. The collar may also have its outside contour formed to permit entry through the lower end of the sleeve. With the construction thus described, the locking device reciprocates at all times with the shank but does not rotate with the shank.

An actuating handle 42b is provided for the shaft 38b and the ends of the handle 42b are formed to fit within ribs 43b formed on the housing 110b to hold the shaft from rotation in its respective position.

In order to permit the securing to the spring hook of either a swivel as is utilized in the rotary process of drilling wells or an elevator as is utilized in the making up or breaking down of the sections of drill pipe when lowering the drill pipe into or removing the same from the well, the hook 9 is preferably constructed so that the bill 46 will receive the bail 47 of the swivel 48 and 50 projecting from the lower portion of the hook 9 is a trunnion 49 upon which a yoke 50 may be journaled. The yoke 50 is formed to receive the bails 51 which are connected with and support the elevator 52 from the spring hook assembly.

The hook 9 is so formed that its center of gravity indicated at 53 is in such position that without the elevator or the swivel being positioned relative to the spring hook, the hook will assume the position illustrated in Figure 6 with its center of gravity 53 upon the axial center of the shank 7, thereby positioning trunnion 49 in axial alignment with the axis of the shank 7.

Referring to Figures 1 and 12 with the bail 47 of the swivel 48 within the bill 46 of the hook, the center of gravity 53 of the hook 9 will be translated so that the axis of the trunnion 49 will be angularly translated from the axis of the shank 7 of the spring hook, permitting the swivel 48 to hang directly in axial alignment with the axis of the shank 7 of the hook.

In order to hold the hook 9 in this position, a lock means is preferably provided such, for example, as is illustrated in Figure 12 for preventing rotation of the hook 9 upon the yoke pin 10.

This lock means preferably includes a releasable lock member 54 which engages the detent 56 to prevent rotation of the hook 9 upon the yoke pin 10 in one direction and the upper portion of the hook 9 is formed with a shoulder 57 which engages the yoke 8 to prevent rotation of the hook 9 in the opposite direction.

The releasable lock member 54 is secured to a shaft 58 which extends through the yoke 8 and is provided with an actuating handle 59 for rotation of the releasable lock member 54 to and from locking position. The handle 59 and releasable lock member 54 are so related to the shaft 58 that when the lock member 54 is rotated to locking position the weight of the lock member 54 and handle 59 tend to hold the lock member 54 in locking position with relation to the detent 56 of the hook 9.

The yoke 50 is journaled upon the trunnion 49 upon an anti-friction bearing 60 which is interposed between the yoke 50 and a nut 61 threaded to the end of the trunnion 49. In order to enclose the bearing 60, the yoke 50 is formed with a cylindrical extension 62 to which a closure cap 63 is threaded.

In order to releasably secure the bails 51 of the elevator to the yoke 50, the yoke 50 is formed with receiving ears 64 having link-receiving depressions 65 into which the ends of the curved links 51 normally fit. The link-receiving depressions are formed at the end of the link recesses 66 formed in the ear 64, and these recesses 66 are normally closed by closure blocks 67 held in position by means of bolts 68 when the links or bails 51 of the elevator are in position. As the yoke 50 is thus journaled upon the trunnion 49 and it becomes desirable at times to hold the elevator 52 from rotation relative to the spring hook, lock means is preferably provided which may be of the construction as illustrated in Figure 16, including a lock shaft 69 which is journaled within the yoke 50 and provided with a lock detent 70 adapted to fit in lock recesses 71 formed in the trunnion 49.

The elevator yoke 50 is preferably rotated 90° from its position shown in Figure 1 and may be locked in this position, thereby bringing the principal plane of the yoke into the line of the principal plane of the hook 9 when elevating the elevators in the derrick. This practice avoids any chance of the hook 9 striking the finger board in the oil well derrick when traveling upwardly.

The rotation of the yoke 50 into the principal plane of the hook 9 also permits of greater freedom of operation of the derrick man in reaching for the elevators preparatory to the snapping of the elevators around the pipe.

It will be seen from the foregoing that in the form of device embodying my invention the yoke 50 is rotated so that the plane passing through the ears 64 lies in the principal plane passing through the hook 9.

A handle 72 is provided for actuating the shaft 69 and the handle is preferably of a double-headed construction so that either of its heads may fit within ribs 73 formed upon the yoke 50 to hold the shaft 69 from rotation when in either of its operative positions.

In the construction herein provided, and with the yoke 50 swiveled on the trunnion 49 as hereinabove described, the use of shorter elevator links or bails 51 is permitted than with other types of construction.

The spring hook as embodying my invention provides a convenient means for use in a rotary drilling process and contributes greatly to the ease of handling the swivel 48 and the elevator 52 under drilling and pipe pulling conditions, and by location of the center of gravity 53 of the hook 9 as hereinabove described, free swiveling of the elevator with reference to the hook is permitted with handling the drill pipe.

In the construction as illustrated in Figures 3, 4, and 5, the hook 9b is connected with the bails 51b of the elevator 52b through the medium of the yoke 50b which is secured to the hook 9b by means of a yoke pin 49b which is passed transversely through the body of the hook 9b and the yoke 50b which provides for a non-swiveling type of yoke for supporting the elevator 52b from the spring hook. In this construction the yoke can not be placed in a plane with the hook when handling drill pipe with the elevator.

Having fully described my invention, it is to be understood that I do not wish to be limited to the details herein set forth, but my invention is of the full scope of the appended claims.

I claim:

1. In a device of the class described, the combination of a supporting member, a hook carrying member carried by said supporting member and adapted for longitudinal movement relative thereto, yieldable means between said members for resisting longitudinal movement of the hook carrying member relative to the supporting member, one of said members defining an enclosed chamber, the other member including a shank projecting through one end of the chambered member and being partially contained within said chamber, a differential piston within the chambered member operatively connected with the shank member, said differential piston being proportioned to maintain a constant volume within the chambered member by compensating for the volumetric change which is incidental to the relative reciprocation of the shank member, a fluid within said chamber, and a restricted passage to control the velocity of the fluid therethrough when being displaced from one end of the chamber to the other upon relative reciprocating movement of the differential piston.

2. In a device of the class described, the combination of a supporting member, a hook carrying member carried by said supporting member and adapted for longitudinal movement relative thereto, yieldable means between said members for resisting longitudinal movement of the hook carrying member relative to the supporting member, one of said members defining an enclosed chamber, the other member including a shank projecting through one end of the chambered member and being partially contained within said chamber, a differential piston within the chambered member operatively connected with the shank member, said differential piston being proportioned to maintain a constant volume within the chambered member by compensating for the volumetric change which is incidental to the relative reciprocation of the shank member, a fluid within said chamber, a restricted passage to control the velocity of the fluid therethrough when being displaced from one end of the chamber to the other upon relative reciprocating movement of the differential piston, a passage communicating with the opposite ends of said chamber, and a check valve mounted in the passage to limit the flow of fluid through said passage in one direction only.

3. In a hook assembly, in combination, a supporting member, a shank mounted axially of the supporting member, an element secured to the shank defining a supporting shoulder, a collar member, a thrust bearing between the collar and the supporting shoulder to permit free rotation of the shank, resilient means between the collar and the supporting member to yieldably resist the longitudinal movement of the shank relative to the supporting member, and stop means on the supporting member adapted to engage the collar member to limit the travel of the collar member in each direction.

4. In a hook assembly in combination, a supporting member, a shank mounted axially of the supporting member and adapted for longitudinal and rotary movement relative thereto, spring means carried by the supporting member for supporting the shank, complementary means carried on the shank and supporting member to limit the upward travel of the shank under influence of the spring, complementary means carried on the shank and supporting member to limit the downward travel of the shank under influence of an applied load, thrust bearing means to rotatably support said shank relative to said supporting member, said shank being free to rotate throughout its range of travel without imparting relative rotation between the aforesaid complementary means.

5. In a hook assembly, in combination, a supporting member, a hook carrying member carried by said supporting member and adapted for longitudinal and rotary movement relative thereto, a lock ring carried by and enclosed within the supporting member, said ring having a plurality of notches in its periphery, an element on the hook carrying member having a slidable and non-rotatable connection with the lock ring, spring means supporting the hook carrying member on the supporting member, a rotatable lock shaft carried by the supporting member and having a projection to engage in one of the lock ring notches when rotated to one position and adapted to disengage the lock ring when rotated to another position.

6. In a hook assembly in combination, a supporting member, a hook carrying member carried by the supporting member and adapted for longitudinal and rotary movement relative thereto, resilient means interposed between said members, means for releasably locking the members from relative rotation in either direction, said latter means being selectively operative to lock the members against relative rotation in one direction without impairing the unlimited freedom of rotation in the opposite direction.

7. In a hook assembly, in combination a supporting member, a hook carrying member carried by the supporting member and adapted for longitudinal and rotary movement relative thereto, resilient means interposed between said members, means for releasably locking the members from relative rotation in both or either direction, said latter means being selectively operative to lock the members against relative rotation in both directions or operative to lock the members against relative rotation in one direction without impairing the unlimited freedom of rotation in the opposite direction.

8. In a hook assembly, in combination, a supporting member, a hook carrying member carried by said supporting member and adapted for longitudinal and rotary movement relative thereto, resilient means interposed between said members, a lock ring housed within one of said members and having a slidable and non-rotatable connection with the other of said members, ratchet teeth carried by the ring, a pair of pawl members, one to engage the ratchet teeth to prevent the rotation of the ring in one direction and the other to engage them to prevent the rotation of the ring in the opposite direction, means urging the pawls toward engagement with the ratchet teeth, and means to selectively hold either or both of the pawls out of engagement with the lock ring ratchet teeth.

9. A hook assembly, in combination, a hook carrying member, a hook having a bail receiving recess pivotally connected to said hook carrying member and adapted to carry a swivel bail when in one position, and an elevator yoke having a pair of elevator bail receiving recesses adapted to carry the bails of an elevator, said yoke being secured to the lower end of the hook laterally from the vertical axis of the hook when the hook is in the swivel carrying position.

10. A hook assembly including a hook carrying member, a hook having a bail receiving recess pivotally connected to said hook carrying member adapted to carry a swivel bail when in one position, and an elevator yoke having a pair of elevator bail receiving recesses adapted to carry the bails of an elevator, said yoke being secured to the lower end of the hook laterally from the vertical axis of the hook when the hook is in swivel carrying position, and releasable means for maintaining the hook from swinging relative to the hook carrying member when in swivel carrying position.

11. A hook assembly, in combination, a hook carrying member, a hook having a bail receiving recess and being swingedly connected to the hook carrying member, said hook being adapted to carry a swivel bail in the bail receiving recess when in one position, a trunnion secured to the lower end of the hook and being disposed angularly and laterally from the vertical axis of the hook when in the swivel carrying position, an elevator yoke having elevator bail receiving recesses adapted to receive and carry the bails of an elevator, said yoke being rotatably mounted on said trunnion.

12. In a hook assembly, the combination of a hook carrying member, the hook having a bail receiving recess and being swingedly connected to the hook carrying member, the hook being adapted to carry a swivel bail in the bail receiving recess when in one position, a trunnion secured to the lower end of the hook and being disposed angularly and laterally from the vertical axis of the hook when in swivel-carrying position, an elevator yoke having elevator bail receiving recesses adapted to receive and carry the bails of an elevator, means for rotatably mounting the yoke upon said trunnion, and lock means for releasably locking the yoke against rotation relative to the trunnion.

13. In a device of the class described, the combination of a hook having a bail receiving recess adapted to receive the bail of a swivel, a trunnion extending from the body of the hook, and an elevator yoke journaled on the trunnion.

14. In a device of the class described, the combination of a hook, means to pivotally support said hook relative to a horizontal axis, a bail receiving recess formed in the body of the hook to support a bail, said recess having its axis disposed parallel to the axis of said pivotal support and in position laterally disposed horizontally from the center of gravity of the hook, and an elevator supporting means secured to the hook, said means being substantially disposed in a plane passing through the center of gravity of the hook and including the axis of the pivotal support.

15. In a device of the class described, the combination of a hook having a bail receiving recess laterally disposed horizontally with reference to the center of gravity of the hook, means to pivotally support said hook relative to a horizontal axis, and a supporting trunnion carried by the body of the hook with its axis substantially disposed in a plane passing through the center of gravity of the hook and including the axis of the pivotal support.

16. In a device of the class described, the combination of a hook, means for pivotally supporting the hook, the hook having a bail receiving recess adapted to receive the bail of a swivel when in one position, means for releasably latching the hook in said position with reference to said pivotal support, and elevator supporting means secured to the body of the hook in position laterally offset with reference to the bail receiving recess.

17. In a device of the class described, the combination of a body, a shank concentrically disposed within the body, a supporting spring surrounding the shank to engage the body at one end, a differential piston engaging the other end of the spring, a shoulder at the upper end of the shank, a bearing interposed between the differential piston and the shoulder, the body being formed to provide an enclosed chamber, and a restricted passage communicating with the chamber on opposite sides of the piston, and a comparatively non-compressible fluid mounted within the enclosed chamber to dampen the recoil action of the spring in passing through the restricted passage.

18. In a device of the class described, the combination of a body, a shank disposed within the body, means for rotatably supporting the shank with reference to the body, a lock ring having an interrupted surface formed thereon, means for securing the lock ring to the shank to permit of longitudinal movement of the shank with reference to the lock ring and to hold the lock ring from rotation relative to the shank, and means extending from the exterior of the body to within the body and operative to releasably engage the interrupted surface on the lock ring to hold the shank from rotation relative to the body.

19. In a hook assembly, in combination a supporting member, a shank having a hook mounted axially of the supporting member and adapted for longitudinal movement relative thereto, bearing means to rotatably support said shank relative to said supporting member, spring means carried by the supporting member for supporting said shank, stop means carried by the supporting member adapted to engage an element interposed between the spring means and said bearing means to limit the travel of said element in either direction.

20. In a device of the class described, the combination of a supporting member, a hook carrying member carried by said supporting member and adapted for longitudinal movement relative thereto, yieldable means between said members for resisting longitudinal movement of the hook carrying member relative to the supporting member, thrust bearing means to pivotally support one of said members relative to the other, a sleeve rotatably supported relative to the hook carrying member and having a slidable and non-rotatable connection with the supporting member, and means to releasably connect said sleeve and the hook carrying member to hold the hook carrying member from rotation relative to the supporting member.

21. In a device of the class described, the combination of a supporting member, a hook carrying member carried by said supporting member and adapted for longitudinal movement relative thereto, yieldable means between said members for resisting longitudinal movement of the hook carrying member relative to the supporting member, thrust bearing means to pivotally support one of said members relative to the other, a sleeve rotatably supported relative to the hook carrying member and having a slidable and non-rotatable connection with the supporting member, and means carried by the hook carrying member and accessible below the supporting member to releasably connect said sleeve and the hook carrying member to hold the hook carrying member from rotation relative to the supporting member.

22. In a hook assembly, in combination, a supporting member, a hook carrying member carried by said supporting member and adapted for longitudinal and rotary movement relative thereto, a lock ring carried by the supporting member, said ring having a slidable and non-rotatable connection with the hook carrying member, a lock shaft rotatably supported on said supporting member, said shaft being disposed substantially tangentially to the lock ring, means carried by said shaft to operably engage and secure the lock ring against rotation with the shaft in one position, said means being released from engagement with the lock ring upon the shaft being rotated to another position, and retaining means carried by the lock shaft and cooperating with the supporting member to releasably maintain the shaft in its selected position.

23. In a hook assembly, in combination, a supporting member, a hook carrying shank member mounted axially of the supporting member and adapted for longitudinal movement relative thereto, bearing means to rotatably support said shank member relative to said supporting member, resilient means carried by the supporting member for supporting said shank member, a lock sleeve carried by the shank member, said sleeve having a slidable and non-rotatable connection with the supporting member, and lock means supported on said sleeve and adapted to releasably engage the shank member to secure the same against rotation relative to the sleeve.

24. In an assembly of the character described, the combination of a carrying member, a bail-receiving member connected to the carrying member and adapted to receive a bail, a second bail-receiving member adapted to receive a pair of bails, and the latter said member being secured to the lower end of the first said bail-receiving member laterally from the vertical axis of the same when the first said bail-receiving member is in position to carry a load suspended by the first said bail.

25. In an assembly of the character described, the combination of a carrying member, a single bail-receiving member, a double bail-receiving member, means whereby said bail-receiving members are secured together with the double bail-receiving member below the single bail-receiving member, means whereby the double bail-receiving member may rotate with relation to the single bail-receiving member, and means whereby said bail-receiving members are secured to the carrying member to permit rotation of the single bail-receiving member relative to the carrying member.

26. In an assembly of the character described, the combination of a carrying member, a single bail-receiving member, a double bail-receiving member, means for securing the double bail-receiving member to the single bail-receiving member at the lower end of the single bail-receiving member in position laterally offset from the vertical axis of the single bail-receiving member when the single bail-receiving member is in position to carry a load suspended upon the single bail, and means for securing the single bail-receiving member to the carrying member in a manner to permit rotation of the single bail-receiving member with relation to the carrying member.

27. In an assembly of the character described, the combination of a carrying member, a single bail-receiving member, a double bail-receiving member, means securing the double bail-receiving member to the single bail-receiving member at the lower end of the single bail-receiving member in position laterally from the vertical axis of the single bail-receiving member when said single bail-receiving member is in position to carry a load suspended by the single bail, and means for securing the single bail-receiving member to the carrying member so as to permit movement of the single bail-receiving member from its load-supporting position to a position to permit a load to be supported by the bails of the double bail-receiving member substantially in line with the axis of the carrying member.

28. In a hook assembly, in combination a supporting member, a hook carrying member carried by said supporting member and adapted for longitudinal and rotary movement relative thereto, resilient means interposed between said members, a lock ring housed within one of said members and having a slidable and non-rotatable connection with the other of said members, ratchet teeth carried by the ring, a pair of pawl members, one to engage the ratchet teeth to prevent the rotation of the ring in one direction and the other to engage them to prevent the rotation of the ring in the opposite direction, and means urging the pawls toward engagement with the ratchet teeth.

29. In a hook assembly, in combination a supporting member, a hook carrying member carried by said supporting member and adapted for longitudinal and rotary movement relative thereto, resilient means interposed between said members, a lock ring housed within one of said members and having a slidable and non-rotatable connection with the other of said members, ratchet teeth carried by the ring, a pair of pawl members, one to engage the ratchet teeth to prevent the rotation of the ring in one direction and the other to engage them to prevent the rotation of the ring in the opposite direction, means urging the pawls toward engagement with the ratchet teeth, and means to hold either of the pawls out of engagement with the lock ring ratchet teeth.

JOHN D. SPALDING.